United States Patent [19]
Paquet et al.

[11] Patent Number: 5,488,817
[45] Date of Patent: Feb. 6, 1996

[54] METHOD AND APPARATUS FOR THE CONTROL OF SELF-PROPELLED AGRICULTURAL HARVESTING MACHINES

[75] Inventors: Bert J. F. Paquet, Brugge; Guy H. J. Osselaere, Zedelgem; Antoon G. Vermeulen, Ruddervoorde; Wilfried E. D. Gunst, Torhout, all of Belgium

[73] Assignee: Ford New Holland, Inc., New Holland, Pa.

[21] Appl. No.: 266,509

[22] Filed: Jun. 27, 1994

[30] Foreign Application Priority Data

Jun. 28, 1993 [EP] European Pat. Off. ............. 93201879

[51] Int. Cl.⁶ .................................................. A01D 75/00
[52] U.S. Cl. ............................................................ 56/10.2 R
[58] Field of Search .......................... 56/10.2 R, 10.8, 56/11.1, 16.4–16.6, 101; 364/424.01, 188

[56] References Cited

U.S. PATENT DOCUMENTS

| | | | |
|---|---|---|---|
| 4,321,991 | 3/1982 | Teijido et al. | 192/0.034 |
| 4,527,241 | 7/1985 | Sheehan et al. | 56/10.2 R |
| 4,552,547 | 11/1985 | Carnewal et al. | 474/101 |
| 4,744,207 | 5/1988 | Hanley et al. | 56/10.2 R |
| 4,967,544 | 11/1990 | Ziegler et al. | 56/10.2 R |
| 4,967,863 | 11/1990 | Teijido et al. | 180/53.1 |

FOREIGN PATENT DOCUMENTS

| | | |
|---|---|---|
| 0506214 | 9/1992 | European Pat. Off. . |
| 0516894 | 12/1992 | European Pat. Off. . |
| 0529650 | 3/1993 | European Pat. Off. . |
| 8201354 | 4/1982 | WIPO . |

OTHER PUBLICATIONS

AgEng Berlin '90 Technical Papers and Posters Abstracts; International Conference on Agricultural Engineering; Berlin 24–26, pp. 92–95, Oct. 1990.

Abstract—Standardized Microcontroller For Automation Tasks in Agricultural by N. Diekhans; International Conference on Agricultural Engineering—Berlin 1990, pp. 92–95.

*Primary Examiner*—Michael Powell Buiz
*Attorney, Agent, or Firm*—Griffin, Butler, Whisenhunt & Kurtossy

[57] ABSTRACT

A self-propelled agricultural harvesting machine (1) is provided with a single channel network (300) for serial communication of digital data messages between programmable microprocessors (215, 218) in a multi-master configuration. The messages are encoded according to an advanced serial communications protocol and are available to all microprocessors (215, 218). The network comprises an optical transmission network with an active starpoint (230) and plastic optical fibres (231), which link the nodes which lay physically far away from each other. An RS232 socket, which is linked to the network (300), enables loading of data and programs to the microprocessors (215, 218). Thus is obtained a reliable and flexible control system for the machine settings, which comprise on-road and off-road (harvesting) parameters. The introduction of a wide range of automatic control routines simplifies to a large extent the tasks of the operator during operation.

28 Claims, 13 Drawing Sheets

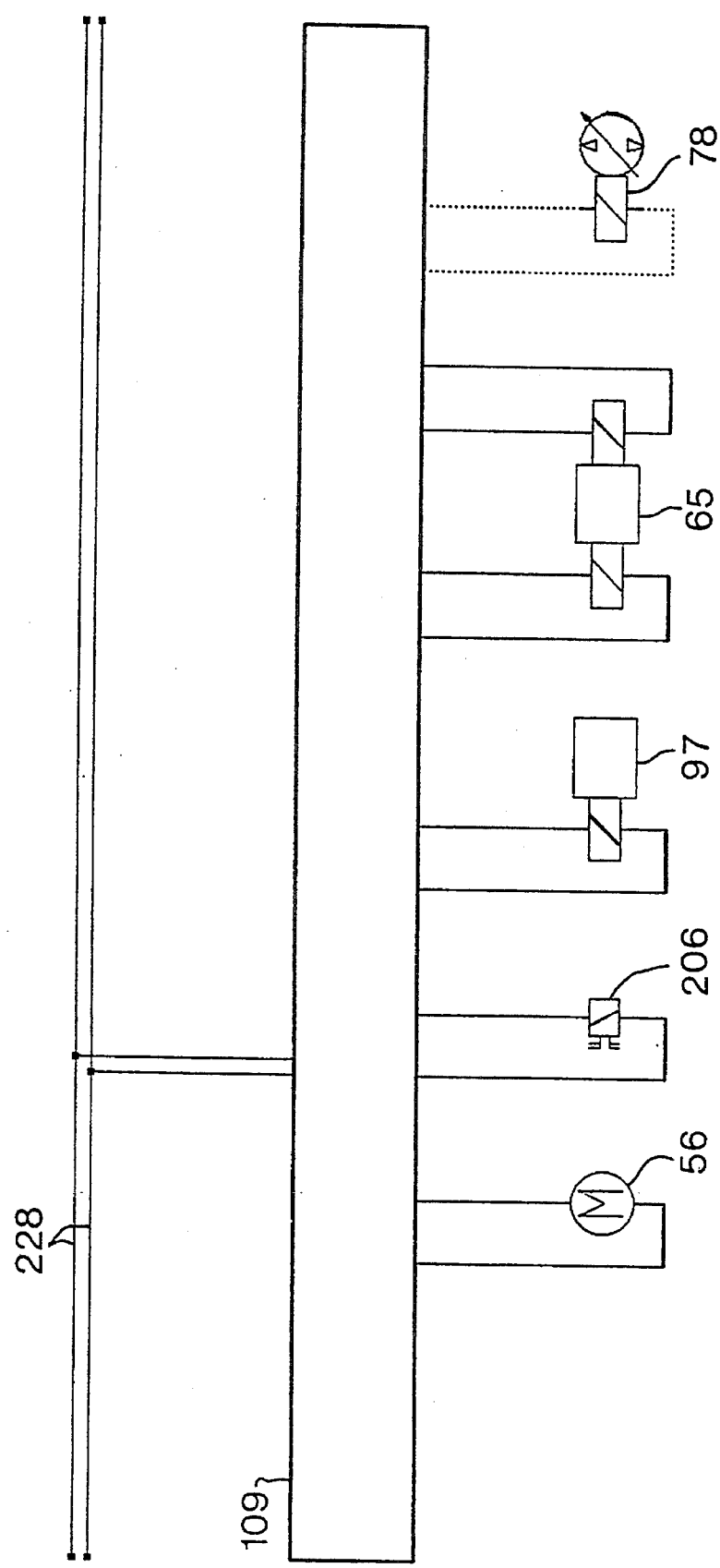

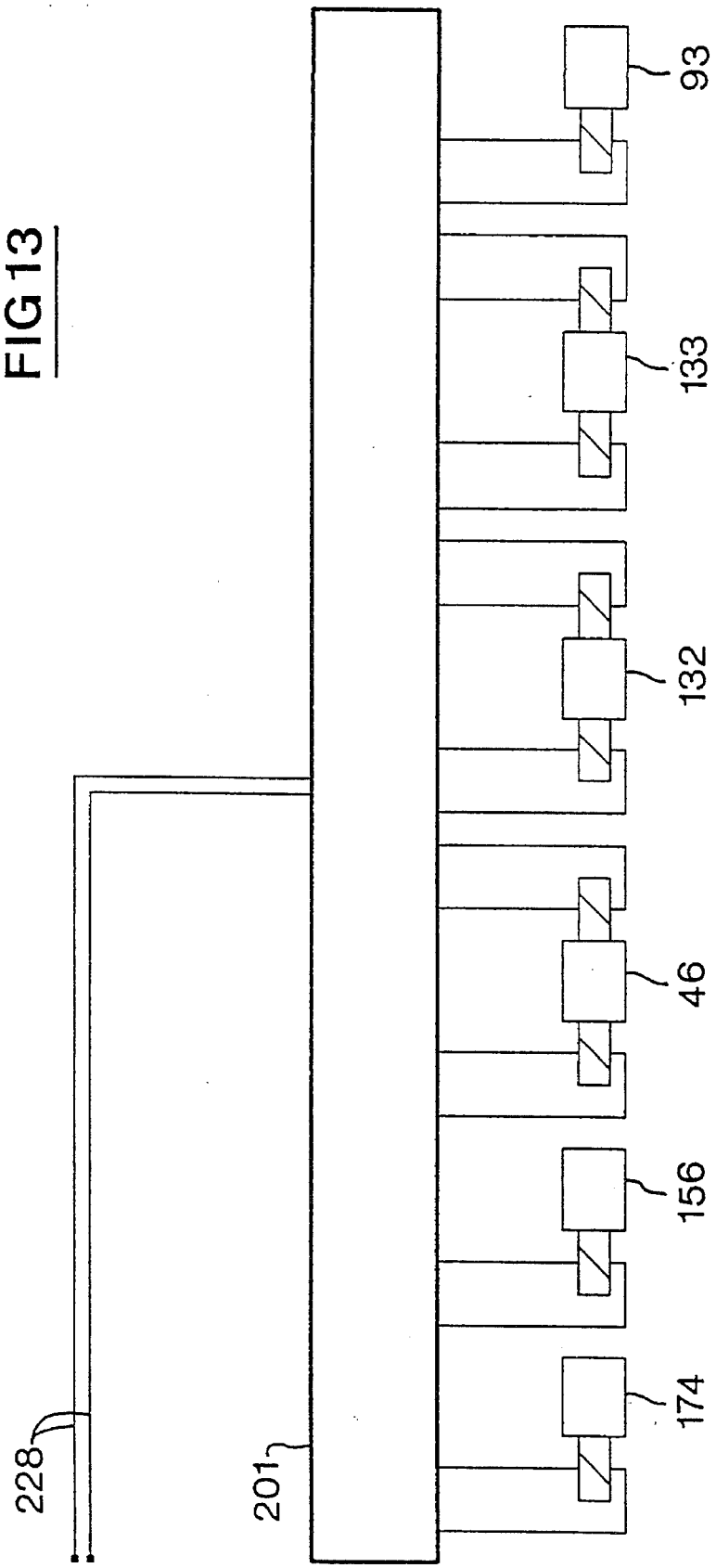

METHOD AND APPARATUS FOR THE CONTROL OF SELF-PROPELLED AGRICULTURAL HARVESTING MACHINES

FIELD OF THE INVENTION

The present invention relates to self-propelled agricultural harvesting machines and more particularly to a method and apparatus or controlling the settings thereof. The invention deals with the problems and drawbacks which are bound to occur when automatic control is introduced on an increasing number of machine settings, while no concessions on reliability and flexibility can be accepted.

BACKGROUND OF INVENTION

The high cost of modern harvesting machines, such as combine harvesters or self-propelled forage harvesters, urges the to employ their machines in a broader range of crop types, geographical locations and weather conditions. Manufacturers, on the other hand, make their machines more versatile through the addition of net crop processing features and the widening of the ranges of the known machine settings. Another trend is the increased machine capacity which reduces the necessary harvesting time per hectare of crop.

As a result both quantity and frequency of machine adjustments have increased substantially. For ease of operation, almost every setting is controlled by the operator from his driving position on the steering platform. The original, fully mechanical control has been replaced by electrical control systems, which may incorporate an electronic device of automatically changing the machines settings, thus simplifying the tasks of the operator.

Actual electrical control systems on harvesting machines require a large number of wires and connections, because a separate conductor is needed for every signal from and to the operator's position. Reliability of such systems is hard to maintain, because chances for mistakes during manufacturing, such as loose or switched connections, are great and the physical connections at the end of the wires are subject to mechanical vibrations and atmospheric corrosion. Moreover, long wires are subject to electromagnetic interferences by radio transmissions and feed unwanted signals to the operator's platform.

If one wants to add a new control device to the harvesting machine, he will be forced to lead new wires to the operator's platform. Therefore, actual electrical systems cannot easily be adapted to modified features, meaning that their flexibility is limited.

The use of a single electronic device, such as a central microprocessor unit, makes the whole machine vulnerable to a complete breakdown caused by failure of this device, and requires a large number of wire connections at the location of the microprocessor unit.

A part of these problems can be overcome by using a plurality of microprocessor units which enable a decentralization of the machine controls. In such configuration every microprocessor handles sensor signals from and actuator signals to a limited part of the machine. This reduces the number of wired connections to the steering platform, but limits the availability of machine data: a signal from one sensor will only be fed to one microprocessor, unless additional wires feed the same signal to other units.

WO-A-82/01354 shows an embodiment in which a plurality of microprocessor units is controlled by a single master microprocessor. Data between the other, slave units have to pass through the master microprocessor, to which the first slave unit has to send a data request signal, whereupon the master microprocessor may or may not immediately request the data from a second slave unit and may deliver the obtained data to the first slave unit. Such process is cumbersome and disturbances to the master unit will affect the whole machine.

SUMMARY OF THE INVENTION

It is an object of the present invention to overcome the aforementioned problems in a straightforward, transparent and flexible way, while risks for corruption of transferred signals are minimized.

According to the present invention a process for controlling settings of a self-propelled agricultural harvesting machine is provided, which comprises the actions of:
—captation by a plurality of programmable microprocessor means of input signals from a communication network and from machine command means and/or machine status sensors;
—the generation of output signals to the communication network and to machine actuator means and/or display means by the microprocessor means.

This process is characterized in that the network comprises a single channel network for serial communication of digital data messages, which have an initial portion for identification of the message type and determination of their relative priority, and in that the network is connected to the microprocessor means through transmitter/receiver units.

Preferably the network comprises an optical transmission network, which passes signals through an active starpoint. Such network eliminates the influence of electromagnetic disturbances on electrical wires. The use of plastic optical fibre further reduces material and installation costs.

Since all data signals on the network are available to all microprocessor means, they all can be used to automatically change the machine settings, thus simplifying the tasks of the operator and avoiding unwanted or hazardous combinations of settings. This process thus can be used to control:

transport settings, such as engine and ground speed, differential lock, four wheel drive, brakes; harvesting settings, such as drum and fan speed, header and header reel settings, drum and straw chopper engagement; and the display of machine status variables and warning messages.

In accordance with one aspect of the invention, apparatus for controlling the settings of a self-propelled agricultural harvesting machine having a plurality of machine command means for producing command signals, a plurality of status sensors for producing status signals, and a plurality of machine actuator means for adjusting said settings, comprises a plurality of microprocessor means disposed in groups, each group being disposed in a different region of the agricultural harvesting machine; first connecting means connecting each respective machine command means, each respective status sensor, and each respective actuator means to a microprocessor means in the group nearest said respective machine command means, the respective status sensors, and the respective machine actuator means; the plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of the microprocessor means is simultaneously transmitted to all the other microprocessor means to cause one of the other microprocessor means to control machine actuator means connected thereto.

A further object of the invention is to provide apparatus as described above for controlling transport settings such as engine and ground speed, differential lock, four wheel drive and brakes; harvesting settings such as drum speed, fan speed, header and header reel settings, drum and straw chopper engagement; and/or the display of machine status variables and warning messages.

BRIEF DESCRIPTION OF THE DRAWINGS

An agricultural harvesting machine embodying the present invention will now be described in further detail, by way of example, with reference to the accompanying drawings, in which:

FIGS. 7 to 13 show in further detail the interconnection of command means, display means, sensor means and actuator means in the network of FIG. 6.

DETAILED DESCRIPTION OF THE INVENTION

Figure 1:
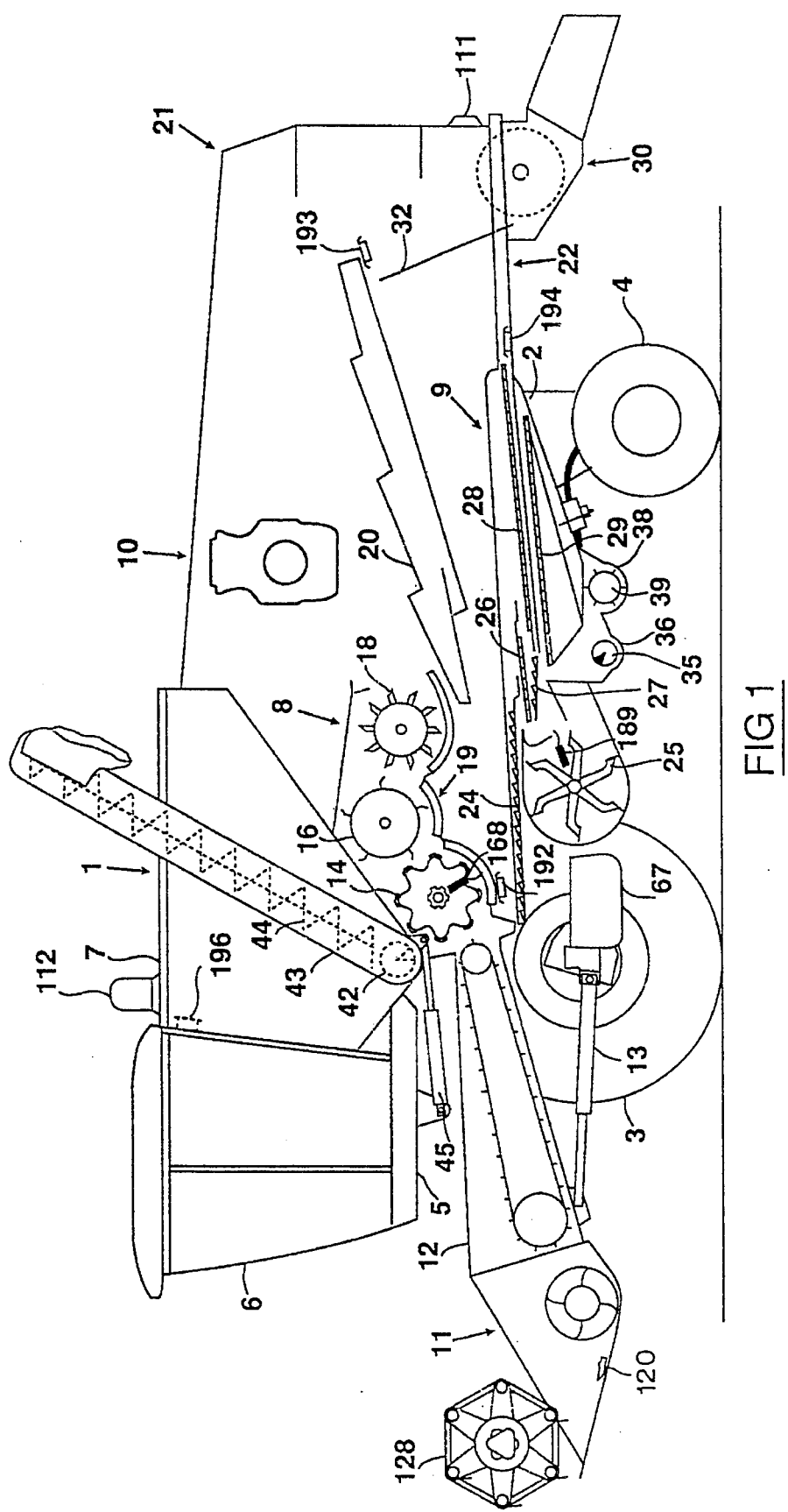
FIG. 1 is a schematic elevational view lengthwise of a combine harvester, showing the means for crop processing.

For convenience, the illustrated agricultural harvesting machine is a combine harvester of conventional design, using straw walkers, but it readily will be appreciated that the invention is equally applicable to the so-called rotary combines, such as the axial flow type combines. The invention also is applicable to other self-propelled harvesting machines, such as forage harvesters, potato harvesters, etc. Its use on a combine harvester should thus not be appraised as limiting.

The terms "forward" "left" "right" "rear" etc used in connection with the agricultural harvesting machine and/or components thereof are determined with reference to the direction of forward operative travel, but should equally not be considered as limiting The terms "grain" "straw" and "tailings" are used principally throughout this specification for convenience, and it should be understood that these terms equally are not intended to be limiting. Thus "grain" refers to that part of the crop material which is threshed and separated from the discardable part of the crop material which is referred to as "straw". Incompletely threshed ears are referred to as "tailings".

For ease of reference, a general description of the combine harvester shown in FIGS. 1 and 2 will be given. This combine harvester, generally indicated at 1, comprises a main chassis or frame 2 supported on a front pair of drive wheels 3 and a rear pair of steerable wheels 4. Supported on the main chassis 2 are an operator's platform 5, with operator's cab 6, a grain tank 7, a first crop processing means, comprising a threshing and separating mechanism 8 and a grain cleaning mechanism 9, and a power plant or engine 10. A conventional header 11 and straw elevator 12 extend forwardly of the main chassis 2 and are pivotally secured to the chassis 2 for generally vertical movement which is controlled by extensible, single-acting hydraulic cylinders 13.

As the combine harvester 1 is propelled forwardly over a field with standing crop, the latter is severed from the stubble by a sickle bar 120 at the front of the header 11, whereafter the header 11 and the straw elevator 12 supply the cut crop to the threshing and separating mechanism 8. The crop received therein is threshed and separated, that is to say, the crop is rubbed and beaten, whereby the grain, seed or the like, is loosened and separated from the straw, coils or other discardable part of the crop.

Figure 2:
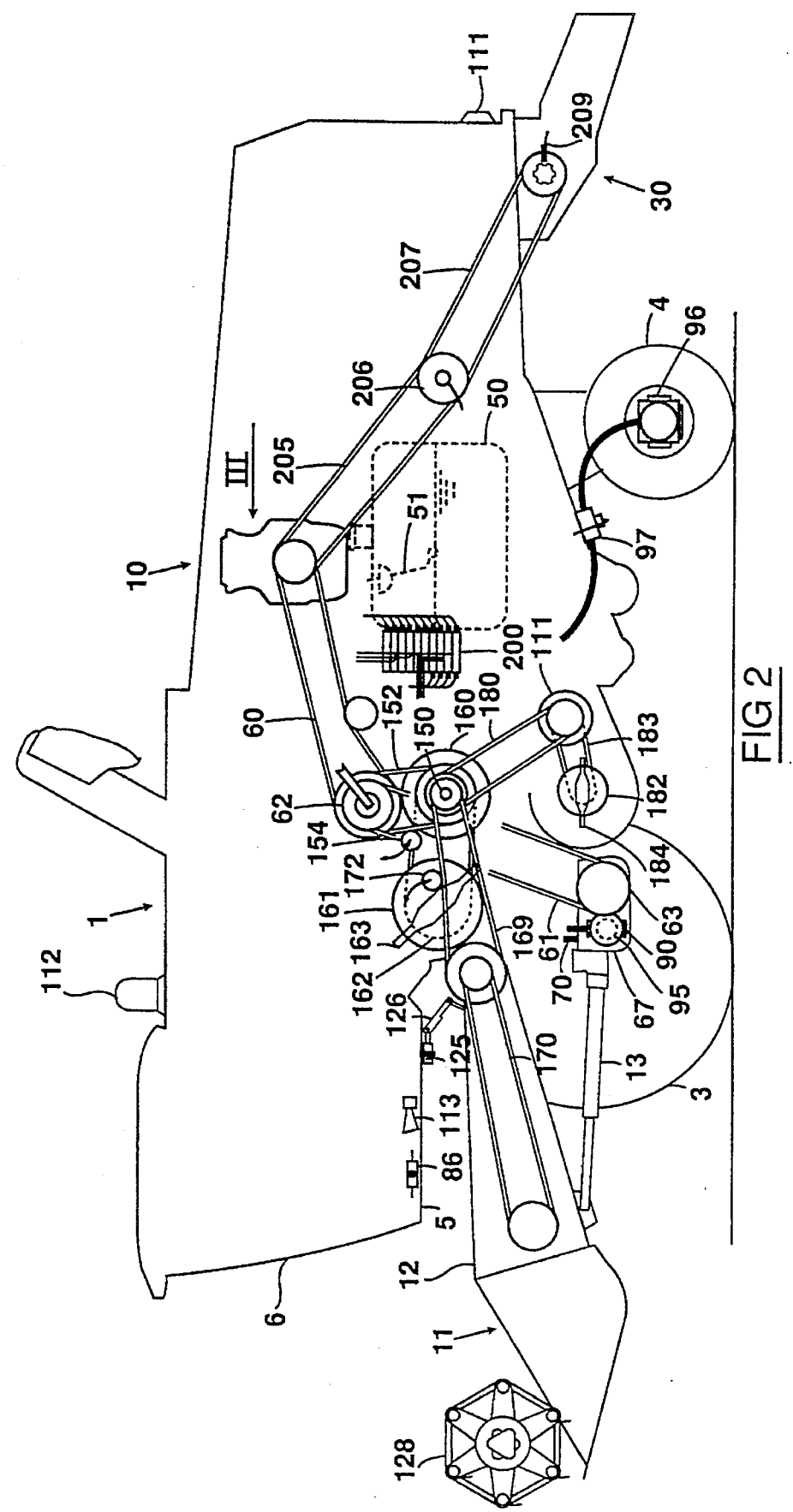
FIG. 2 is a schematic elevational view of the same harvester, showing part of the drivelines thereof.

The combine harvester illustrated in FIGS. 1 and 2 comprises a conventional threshing and separation mechanism 8 including a threshing cylinder 14, a straw beater 16 and a separator rotor 18, cooperating with a set of concaves 19. Conventional straw walkers 20 are operable, in use, to discharge a mat of remaining crop material (i.e. mainly straw as the grain is separated therefrom) through a straw hood 21. A straw deflector plate 32 guides said mat to a second crop processing device which takes the form of a straw chopper 30. Grain which has been separated by the threshing and separating mechanism 8 falls onto a first grain pan 24 of the cleaning mechanism 9 which further also comprises a pre-cleaning sieve 26, positioned above a second grain pan 27, a pair of sieves 28, 29, disposed the one above the other, and a cleaning fan 25.

The grain pans 24, 27 and the sieves 26, 28, 29 are oscillated generally back-and-forth for transporting threshed and separated grain from the first grain pan 24 to the pre-cleaning sieve 26 and the second grain pan 27 and therefrom to the sieves 28, 29. The same oscillatory movement spreads said grain across said sieves 26, 28, 29, while permitting the passage of cleaned grain by gravity through these sieves 26, 28, 29. The grain on the sieves 26, 28, 29 is subjected to a cleaning action by the fan 25 which provides an air flow through said sieves 26, 28, 29 to remove chaff and other impurities such as dust from the grain by making this material airborne for discharge from the machine through an outlet 22 of the straw hood 21.

Clean grain falls to a clean grain auger 35 in a clean grain auger trough 36 and is subsequently transferred therefrom to the grain tank 7. Tailings fall to a tailings auger (not shown) in a tailings auger trough 38. The tailings are transported sideways by said tailings auger to a separate rethresher 39 and returned to the cleaning mechanism 9 for repeated cleaning action.

A grain tank auger 42 at the bottom of the grain tank 7 is used to urge the clean grain sideways to an unloading tube 43, wherein it is elevated by an unloading auger 44 for discharge from the harvester 1.

Figure 10:
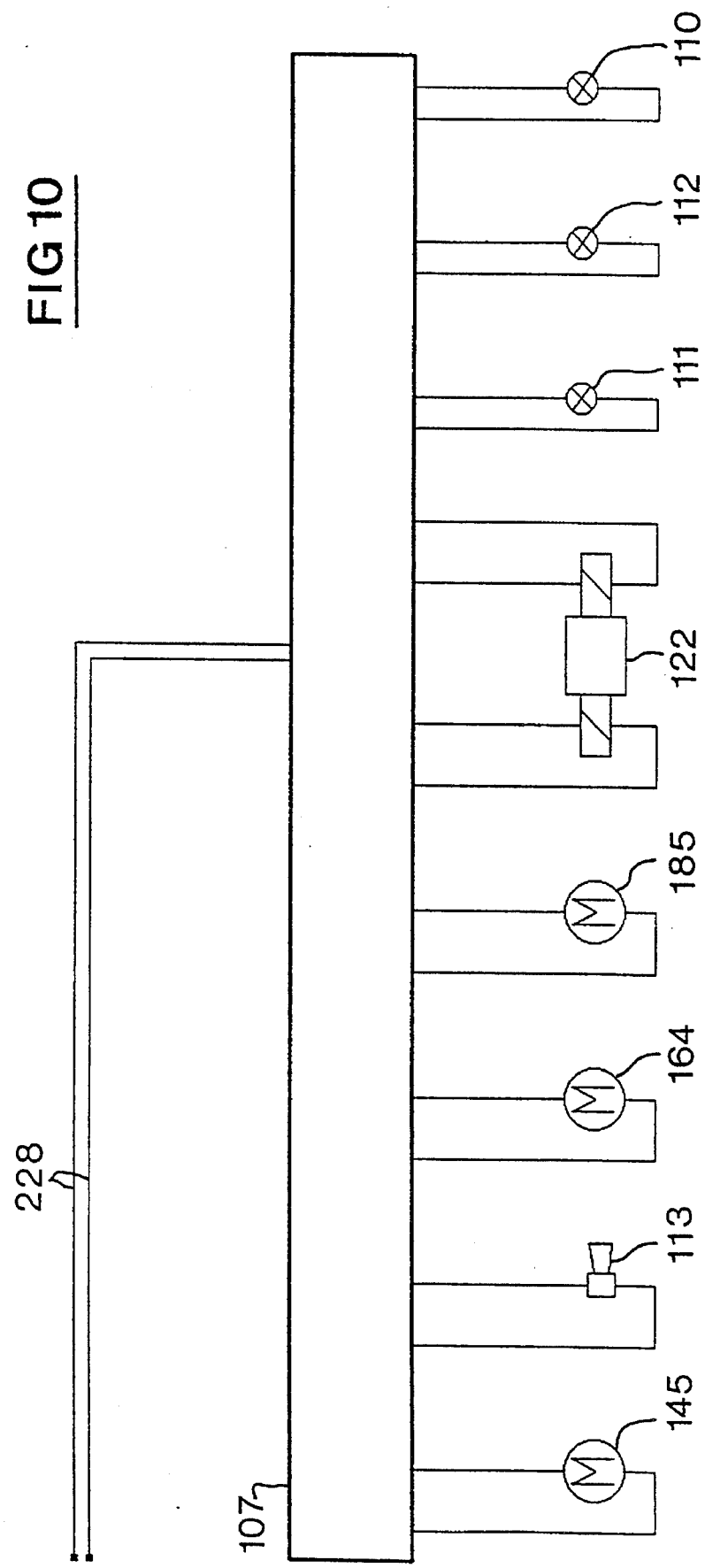

After this general description of the flow of crop material through the machine, the machine settings and controls are now discussed in further detail. Most switches are not illustrated in the FIGS. 1 to 5 but can be found in FIGS. 7 and 8; hydraulic valves are represented in FIGS. 10, 12 and 13.

The engine 10 is taking fuel from a fuel tank 50, in which is mounted a conventional fuel level sensor 51. The electrical resistance measured over this sensor is a function of the fuel level in the tank 50.

Figure 3:
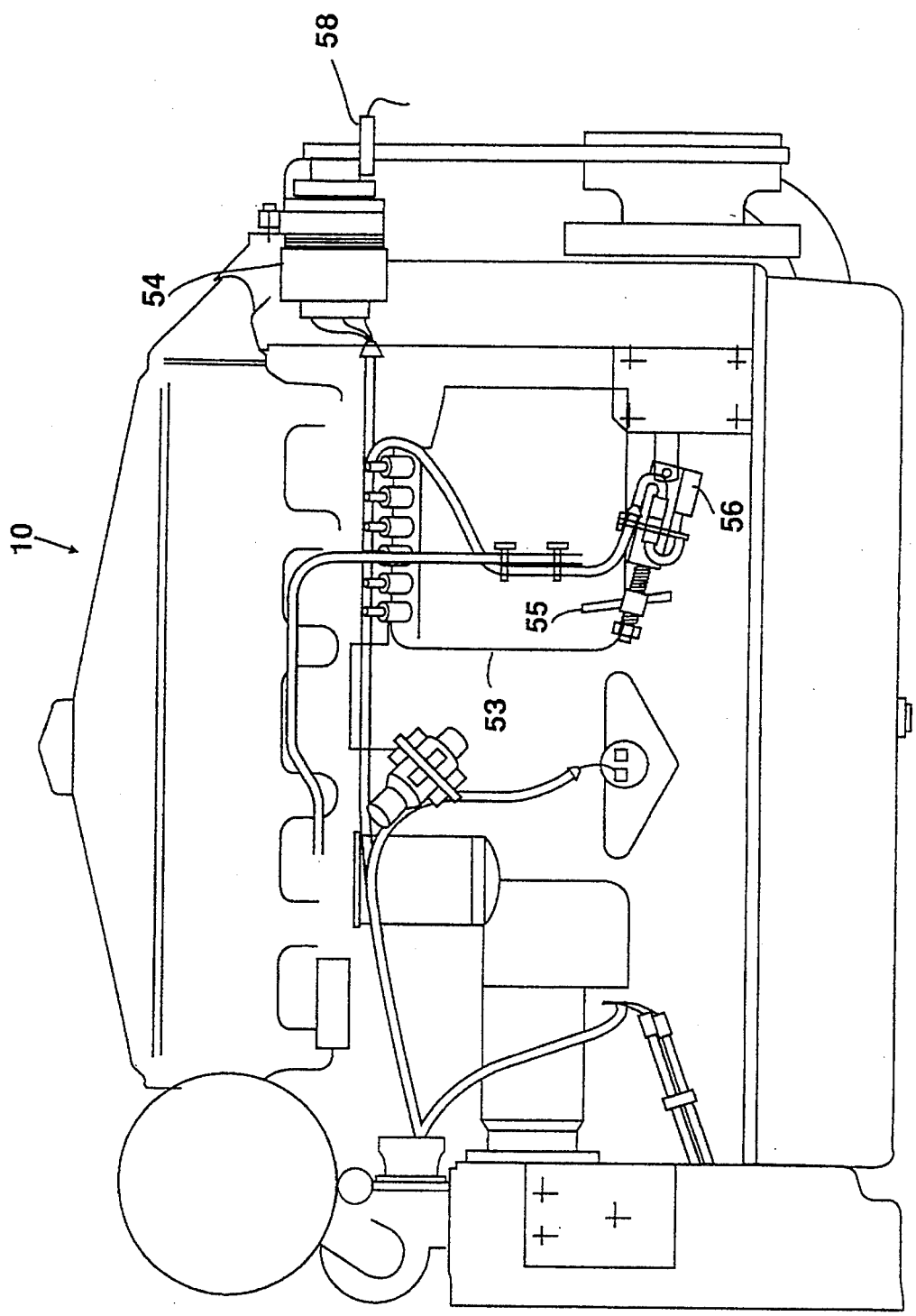
FIG. 3 shows a partial view of the engine section taken in a direction as indicated by the arrow III in FIG. 2.

As illustrated in FIG. 3, the engine speed is controlled by a throttle 55 of a fuel injection system 53. The setting of said throttle 55 is determined by the spindle of an electrical engine speed actuator 56, which comprises a bidirectional electrical motor operable to vary the position of said spindle. The operator commands lowering or increasing of the engine speed through a switch 57 in a dashboard 100 in the cab 6. The actual engine speed is measured by means of an engine speed sensor 58, which is formed by a proximity sensor, operable to sense changes in magnetic field caused by a rotating part of the engine itself or by a part which is directly driven by the engine, such as the rotor of the alternator 54.

As illustrated in FIG. 2, the power from the engine is used to drive the wheels 3 by means of a main drive belt 60, which rotates a first variator sheave 62. This sheave 62 drives a second variator sheave 63 through a ground speed belt 61. The sheave 63 rotates the drive wheels 3 through a gearbox 67 and end drives (not shown). Said variator sheaves 62, 63 are composed of axially movable inner and outer halves, of which the relative position can be altered to change the run of the belt 61 and thus the transmission ratio of this drive. Such transmission system is well known in the art and has been described in further detail in EP-B-0.097.987. The relative position of the halves of the sheave 62 is controlled through an electrically controlled, hydraulic valve 65. The transmission ratio and hence the ground speed of the harvester 1, therefore can be changed electrically.

The actual ground speed of the harvester 1 can be calculated from the number of revolutions of one of the gears in the gearbox 67. The speed of such gear equally is measured by a proximity sensor 70, which senses the changes in magnetic field, caused by the passing teeth of said gear.

The operator commands the setting of said variator sheaves 62, 63 by means of a multifunctional handle 75 positioned next to an operator's seat 76. The pivoting movement of the handle 75 is mechanically transferred to a potentiometric device 80, over which a resistance is measured, which is representative for the wanted ground speed.

Alternatively, the gearbox 67 can be driven by a conventional hydrostatic system, including a variable hydrostatic pump (not shown) mounted to the engine 10, and a hydrostatic motor fixed to said gearbox 67. The flow of hydrostatic oil in this system is governed by an electrically controlled servo valve 78, incorporated in said pump. The operator equally commands the ground speed through the said handle 75 and the potentiometric device 80.

The drive wheels 3 can be slowed down and stopped by a hydraulic braking system, including two brakes 90 mounted on both sides of the gearbox 67. Conventionally each one of said brakes 90 can be actuated separately by the fluid pressure from a master cylinder under action of one the foot pedals 85 at the operator's platform 5. This system permits blocking of one of the wheels 3, while the other still propels the harvester 1 in order to turn it with a small turning radius. For on-road travel the foot pedals 85 can be coupled by a linkage 87, of which the position is checked with a linkage sensor 88 in the form of a proximity sensor. Actuation of the brakes 90 is sensed through a brake sensor 86 including a switch which will be closed by the brake fluid pressure.

A conventional differential mechanism in the gearbox 67 allows movement of the drive wheels 3 relative to each other. This mechanism is blocked by a hydraulic differential lock mechanism 95 upon actuation of an electrically controlled hydraulic valve 93 in order to impede said relative movement and to bring the wheels 3 into unitary movement. Engagement and disengagement of this blocking mechanism is commanded through a switch operated by differential lock pedal 94 at the operator's platform 5.

In order to obtain a Four Wheel Drive (4WD) configuration, the steerable wheels 4 are driven by hydrostatic motors 96, which are connected to the conventional hydrostatic system for the front wheel drive through an electrically controlled valve 97. Engagement and disengagement of this 4WD system is commanded by an ON/OFF switch 98 at the dashboard 100.

The harvester 1 is equipped with a plurality of lights such as front and rear road lights 110 (only shown in FIG. 10), stop lights 111 at the rear and a rotating light 112 on top of the harvester. These lights 110–112 are energized by a solid state power module 107. The road lights 110 are commanded through a switch (not shown) at a steering column 83 in the cab 6, the rotating light 112 through a switch 115 in the dashboard 100 and the stop lights 111 through the brake pressure sensor 86. The same power module 107 is used to energize a horn 113 underneath the operator's platform 5 upon pushing a switch at the steering column 83 in the cab 6.

The height of the header 11 above the ground level is controlled by the single-acting hydraulic cylinders 13 which are connected to an electrically controlled, hydraulic valve 122. Lifting and lowering of the header are commanded through push buttons 123 in the multifunctional handle 75. The actual height of the header can be derived from the angle between operator's platform 5 and the straw elevator body 12. This angle is sensed by a variable resistor 125, whereof the body is fixed to the platform 5 and the movable core is held in contact with a notch lever 126 which is linked to the elevator 12.

Figure 4:
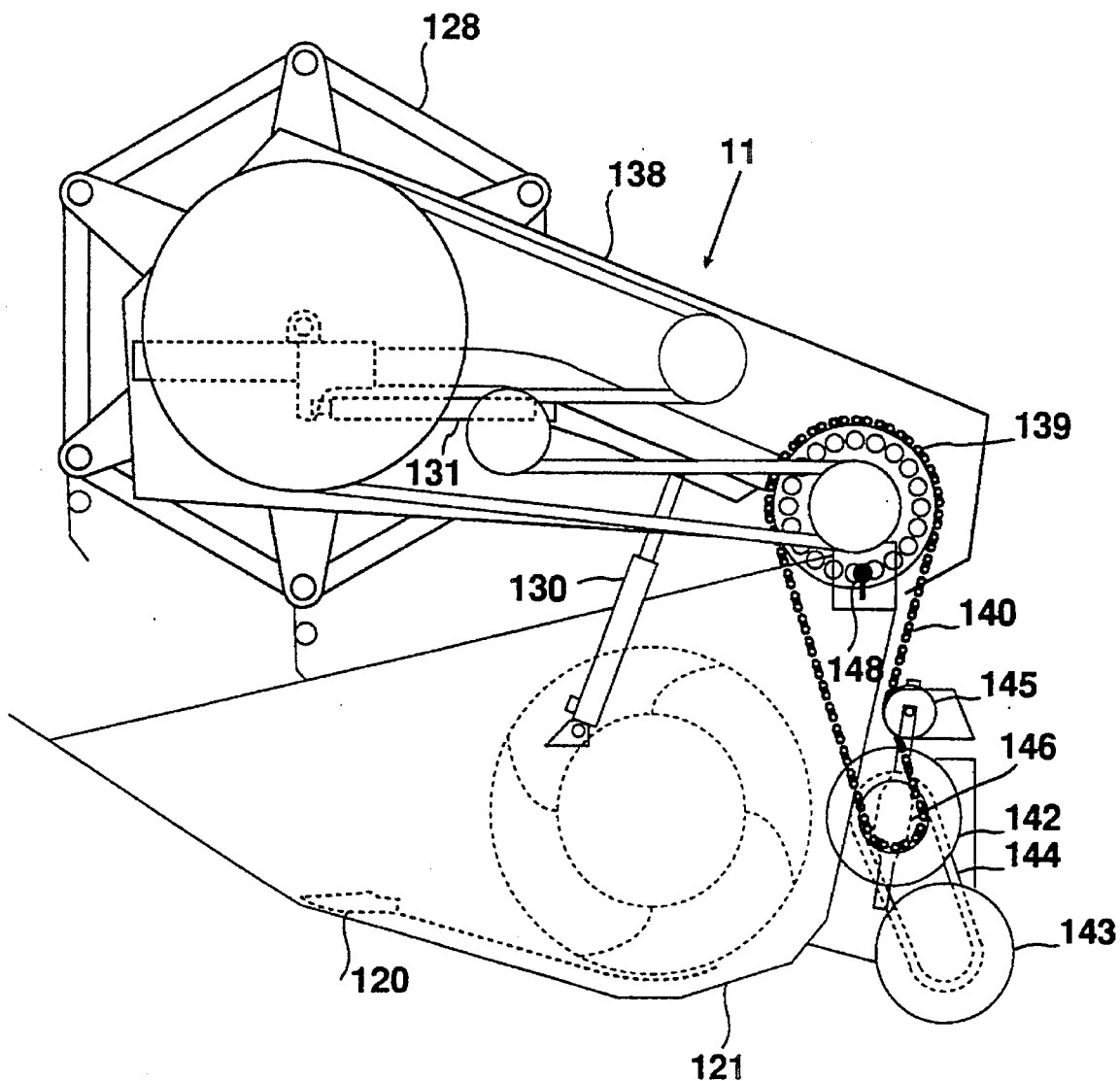
FIG. 4 illustrates to a larger scale the header of the harvester in FIGS. 1 and 2.
Figure 5:
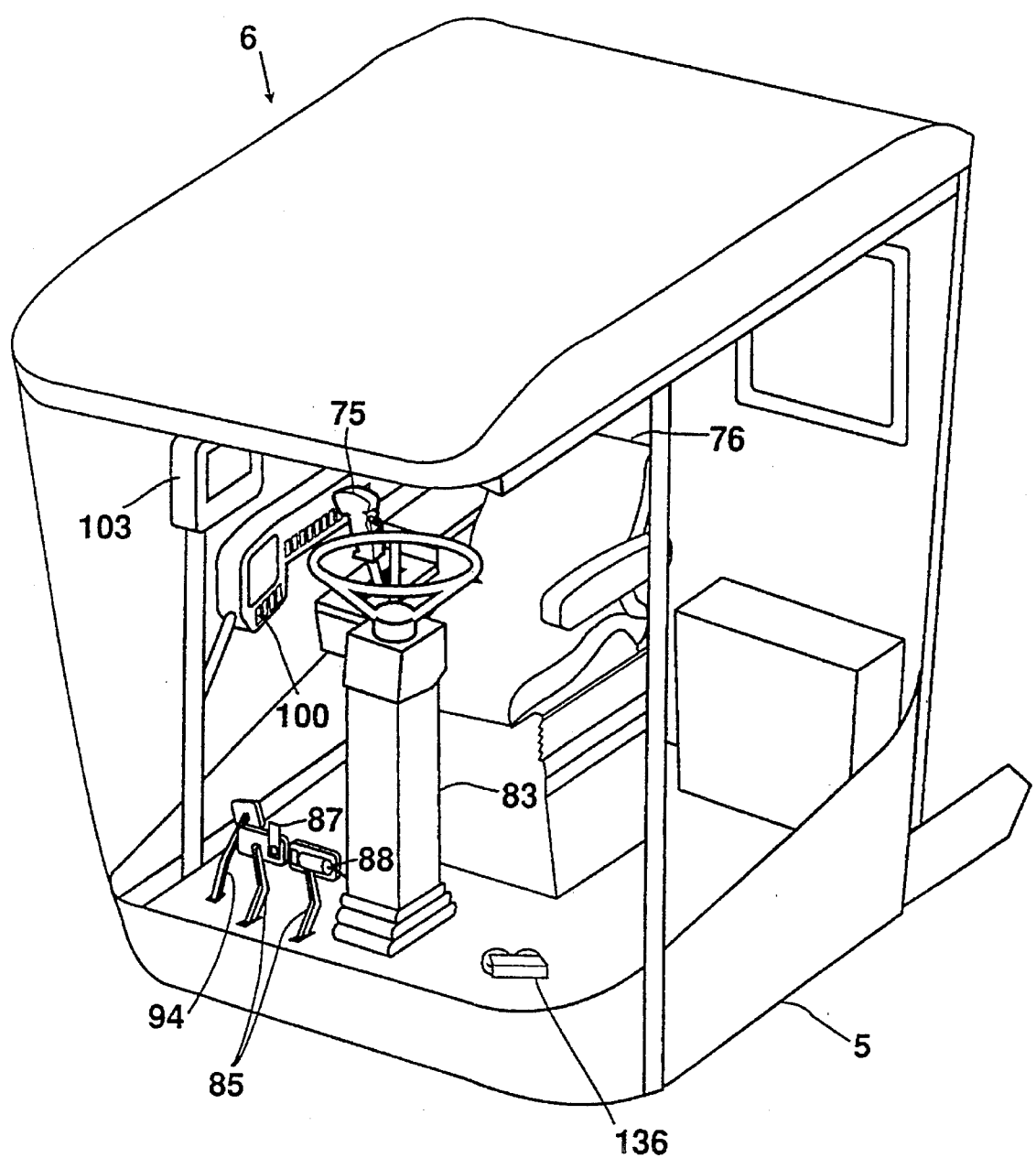
FIG. 5 shows to a larger scale the operator's cab of the harvester in FIGS. 1 and 2.

As illustrated in FIG. 4 a header reel 128, which comprises six tines (not shown) is mounted for rotation on two pivotable arms 129 over a header frame 121. The position of the reel 128 needs adjustment to accommodate various crop conditions. To this end a first pair of single-acting hydraulic cylinders 130 lifts or lowers the arms 129 and a second pair of double-acting hydraulic cylinders 131 moves the rotation shaft of the reel 128 forwards or backwards along said arms 129. The cylinders 130, 131 are controlled by two electrically controlled valves, 132 and 133 respectively. Both valves are incorporated in a valve block 200 at the side of the harvester 1. Vertical reel adjustment is commanded through the buttons 135 in the multifunctional handle 75 and horizontal adjustment is commanded through the foot switches 136 on the operator's platform 5.

The reel 128 is rotated by a reel-belt 138 which is driven by a sprocket and pulley assembly 139. This assembly is rotated through a chain 140 by a conventional variator arrangement comprising a driving sheave 143, a driven sheave 142 and a reel variator belt 144. The axially movable half of sheave 142 is held in position by a set of arms 146, which can be moved inwardly and outwardly by the spindle of an electrical motor 145 in order to change the run of belt 144 and hence the speed transmission ratio over this variator arrangement, whereby the reel speed, i.e. the relative speed of the reel tines to the header frame 121, is increased or lowered. Command of this speed adjustment is possible through push buttons 148 in said multifunctional handle 75.

The sprocket of the assembly 139 is perforated along an inner diameter and a proximity sensor 148 is positioned at this diameter. The frequency of the pulses, generated in the sensor 148 by the passing perforations during rotation of the reel 128, is proportional to the reel speed, and thus is appropriate for the calculation of said speed.

Referring again to FIG. 2, the first crop processing means, comprising the threshing and separation mechanism 8 and the grain cleaning mechanism 9, and the header 11 are driven by sheaves on an intermediate shaft 150. Driving power to this shaft 150 is delivered by the engine 10 by means of the main drive belt 60 and a threshing engagement belt 152. An idler 154 can be pivoted to the front to release the tension on the belt 152, which then will get detached from its pulleys and cease its movement. Upon backward movement of the idler 154 the belt 152 is pushed into engagement again. The position of said idler 154 is controlled by a double-acting hydraulic cylinder (not shown), steered by an electrically controlled, hydraulic valve 156, which is incorporated in the valve block 200. Engagement of the first crop processing means is commanded by the operator by means of a threshing engagement ON/OFF switch 158 in the dashboard 100.

The threshing cylinder 14 is driven by a second conventional variator arrangement comprising a driving sheave 160, a driven sheave 161 and a threshing variator belt 162. The axially movable half of sheave 161 is held in position by a set of arms 163, which can be moved inwardly and outwardly by the spindle of an electrical motor 164 in order to change the run of belt 162 and hence the speed transmission ratio over this variator arrangement, whereby the rotational speed of the threshing cylinder 14 is altered. The operator commands the speed adjustment by means of a monostable switch 166 at the dashboard 100.

The actual drum speed is measured by a proximity sensor 168, which is mounted near and directed to the shaft of the threshing cylinder 14.

The straw elevator 12 and header 11 are driven by a belt transmission comprising a header engagement belt 169 and a header drive belt 170. An idler 172 can be pivoted upwardly to release the tension on the belt 169, which then will get detached from its pulleys and cease its movement. Upon downward pivoting of the idler 172 the belt 169 is pushed back into engagement. The position of said idler 172 is controlled by a double-acting hydraulic cylinder 173, steered by an electrically controlled, hydraulic valve 174, which is incorporated in the valve block 200. Engagement of the straw elevator 12 and header 11 is commanded by the operator by means of a header engagement ON/OFF switch 176 in the dashboard 100.

The grain cleaning mechanism 9 is driven by the intermediate shaft 150 through a belt 180. The same belt 180 is rotating the first sheave 181 of a fan variator arrangement, which further comprises a driven sheave 182 and a fan variator belt 183. The axially movable half of sheave 182 is held in position by a set of arms 184, which can be moved inwardly and outwardly by the spindle of an electrical motor 185 in order to change the run of belt 183 and hence the speed transmission ratio over this variator arrangement, whereby the rotational speed of the fan 25 is altered. The operator commands the fan speed adjustment by means of a monostable switch 187 at the dashboard 100.

The actual fan speed is measured by a proximity sensor 189, which is mounted near and directed to the rotating shaft of the fan 25.

Under the concaves 19 and under the rear end of the straw walkers 20 and the sieve 28 are mounted impact detector plates 192, 193,194, which generate an electric signal which is a function of the frequency of grain impacts thereon. The plates 193 and 194 sense the flow of lost grain at the outlet of the harvester 1 and are used as loss sensors. The plate 192 under the concaves receives grain from the very start of the threshing operation and is used as a threshing status sensor; its signal is proportional to the crop flow in the threshing and separation mechanism 9 and is reduced substantially when this mechanism 9 is running idle. Such detector plates have been described in detail in EP-B0.339.140 and will not be discussed here any further.

When the grain in the grain tank 7 reaches a predetermined level, a switch is closed by the pressure of the grain on the surface of a grain level sensor 196. The signal from this sensor 196 is used to light one of the LEDs 198 of a warning lights module 101 in the dashboard 100.

The position of the unloading tube 43, which is pivotally secured at the side of the grain tank 7, can be changed by means of a double-acting hydraulic cylinder 45, which is mounted between the operator's platform 5 and the lower end of said tube 43. The cylinder is steered through an electrically controlled valve 46, which is incorporated in the valve block 200. The changes in tube position are commanded through a monostable switch 48 in the dashboard 100.

The rotor of straw chopper 30 is driven by the engine 10 through a belt transmission, comprising a front chopper belt 205, a chopper clutch assembly 206 and a rear chopper belt 207. The belts 205, 207 run over two sheaves of the clutch assembly 206, which further comprises an electromagnet which couples both sheaves when loaded, in order to rotate the straw chopper 30. Engagement of the clutch assembly 206 is commanded by an ON/OFF switch 210 at the dashboard 100. The speed of the rotor is sensed by a proximity sensor 209 near and directed to the rotating shaft of said rotor.

Figure 6:
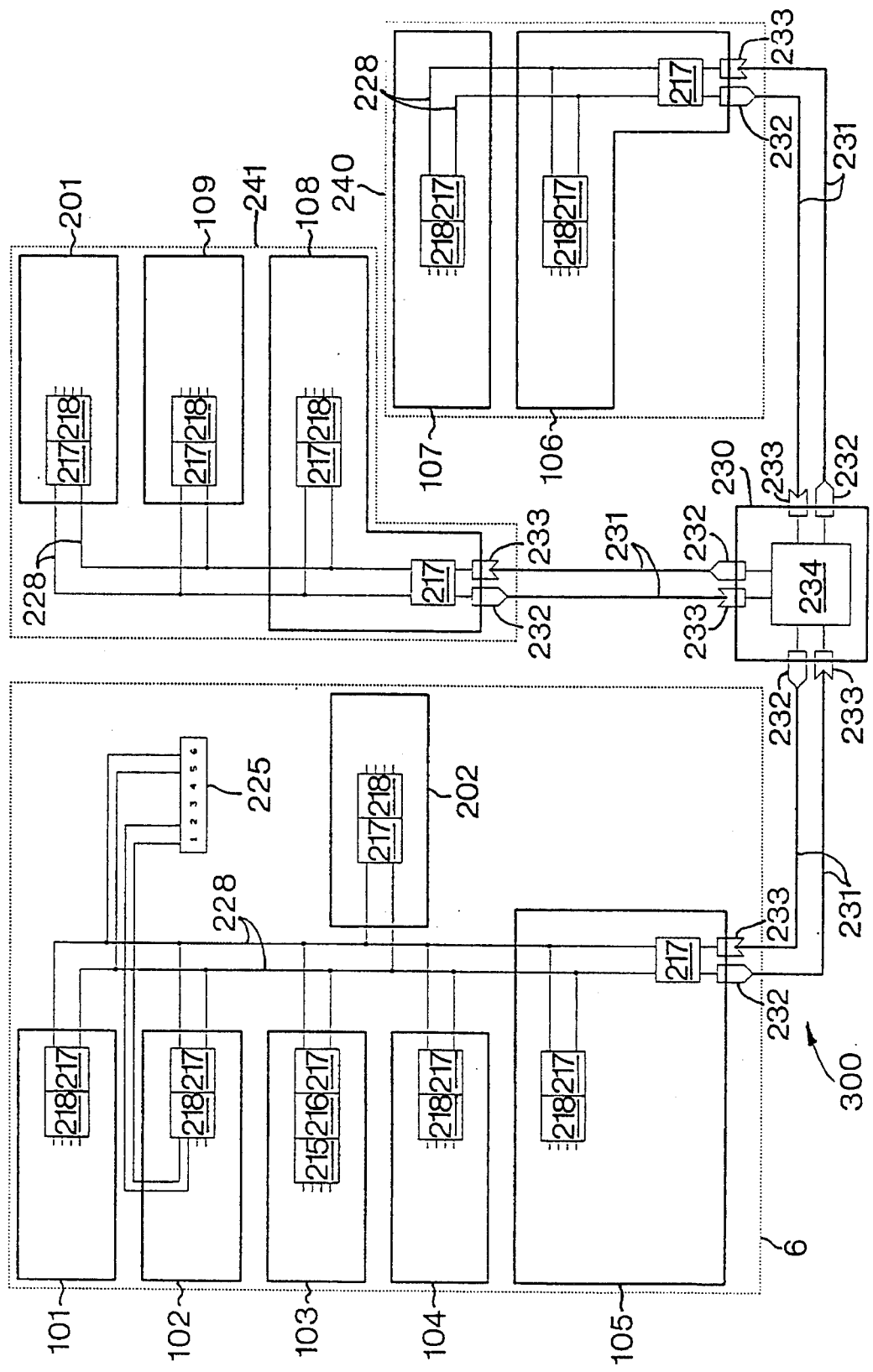
FIG. 6 shows the configuration of a communication network according to the invention.

The various settings of the machine are controlled by means of a communication network 300 which is generally depicted in FIG. 6. The network 300 is a bi-directional single-channel network for the serial communication of digital data between microprocessor means 215, 218. These data are coded according to an advanced serial communications protocol with a very high level of security, such as the Controller Area Network (CAN) protocol, described in "CAN specification, Version 1.0", published in 1987 by Robert Bosch GmbH. According to this protocol interference of messages is prevented by giving to every message an initial, identifier portion, which indicates the type of the message and determines its relative priority. During the transmission of a message to the network 300 the microprocessor means 215, 218 keep receiving signals from said network 300, and when a higher priority message is detected, the lower priority message is truncated. This message is repeated automatically, when the higher priority message is finished. The messages are coded for detection of transmission errors. As the identifier has a length of 11 bits a wide range of message types can be sent to the network. CAN enables effective communication between microprocessor units in a multi-master configuration, that is to say that no single microprocessor steers the whole network 300. For further details on the CAN protocol we refer to the said Bosch publication.

The signals from and to the other electrical components, including command means, sensor means, machine actuator and display means, are collected or generated by electrical modules 101–109, 201–202, which comprise circuit boards and programmable microprocessor means 215, 218 for the automatic control of machine settings. These microprocessor means 215, 218 also transmit to and receive from the network 300 messages which are coded according to the CAN-protocol. Both the controlling and communicational functions can be integrated into one single chip. A microprocessor means 218 of this type is the Motorola chip 68HC705X4, which is installed in most of the modules 101–109, 201–202.

However, the data storage and processing capacity of such chips is limited. Where the number and/or complexity of controls require a higher data processing capacity, a conventional, more powerful microprocessor 215, is installed and linked to a separate CAN chip 216 for communication of CAN-coded messages from and to the network 300. Such conventional microprocessor 215 is the Motorola chip 68HC11, which is installed in the display module 103. Network messages are encoded and decoded by the separate Philips CAN chip PCA 82C200.

Transmitter-receiver units 217, such as the Philips PCA 82C250, make the connection with a wired portion 228 of the network 300.

As every module 101–109, 201–202 is linked to the network 300 through its own microprocessor means 215, 218 and as the network communication according to the CAN protocol is not controlled by one single (master) microprocessor, there will be no obstruction to the data exchange between the other modules, when a microprocessor means 215, 218 of any module breaks down partially or completely.

The network 300 comprises three wired portions 228, which each comprise two electrical conductors. Each portion 228 interconnects modules which physically are located close to each other: a first portion 228 is linked to the modules 101–105 and 202, which are mounted in the cab 6; a second portion 228 to the modules 106 and 107 in a central box 240 below the grain tank 7; and a third portion 228 to the modules 108, 109 and 201 in a second box 241 near the engine 10.

Considering the fairly long distances between the boxes 240, 241 and the cab modules, it is not recommended to interconnect these three portions 228 with electrical wires. Indeed, in case electrical conductors are used for long distance transmissions, electro-magnetic interferences may generate unwanted signals in the network 300 and thus may disturb the transmission of messages. Therefore these interconnections are realized by an optical transmission network, in which the messages are formed by light pulses, which cannot be affected by radio transmission.

The modules 105, 106 and 108 each contain a second CAN-transmitter-receiver unit 217, which is linked to an optical transmitter 232, such as the SFH452V, and to an optical receiver 33, such as the SFH551V, both of Siemens. The optical signals pass through plastic optical fibres 231, which permit good data transmission over distances, such as those between the cab 6 and the boxes 240 and 241, and do not require the very strict precautions which are needed for the assembly of the more expensive and vulnerable glass optical fibre.

Each module 105, 106, 108 is linked to an optical star module 230 by two fibres 231 of which one is connected to the optical transmitter 232, and the other to the optical receiver 233 of said modules. At the star module 230 an active starpoint is formed by connecting an electrical circuit 234 to optical transmitters 232 and receivers 233. The incoming optical message from a module 105, 106, 108 is received at one of the star receivers 233 and transformed into an electrical signal, which is OR'd with the signals from the other modules by said circuit 234. The resulting logical OR signal is transferred to all optical star transmitters 232 and fed to the optical receivers 233 of the modules 105, 106 and 108. Such optical star network enables CAN transmission between a plurality of optical nodes and guarantees a sufficient power budget at all optical nodes. Passive star points, which only divide the energy of incoming light pulses over a plurality of outgoing fibres, will need more powerful transmitters 232 at the modules 105, 106, 108 in order to obtain the same transmission quality.

By way of example a possible repartition of command means, sensor means, machine actuator means and display means over a plurality of modules 101–109,201 will now be described in further detail.

Figure 7:
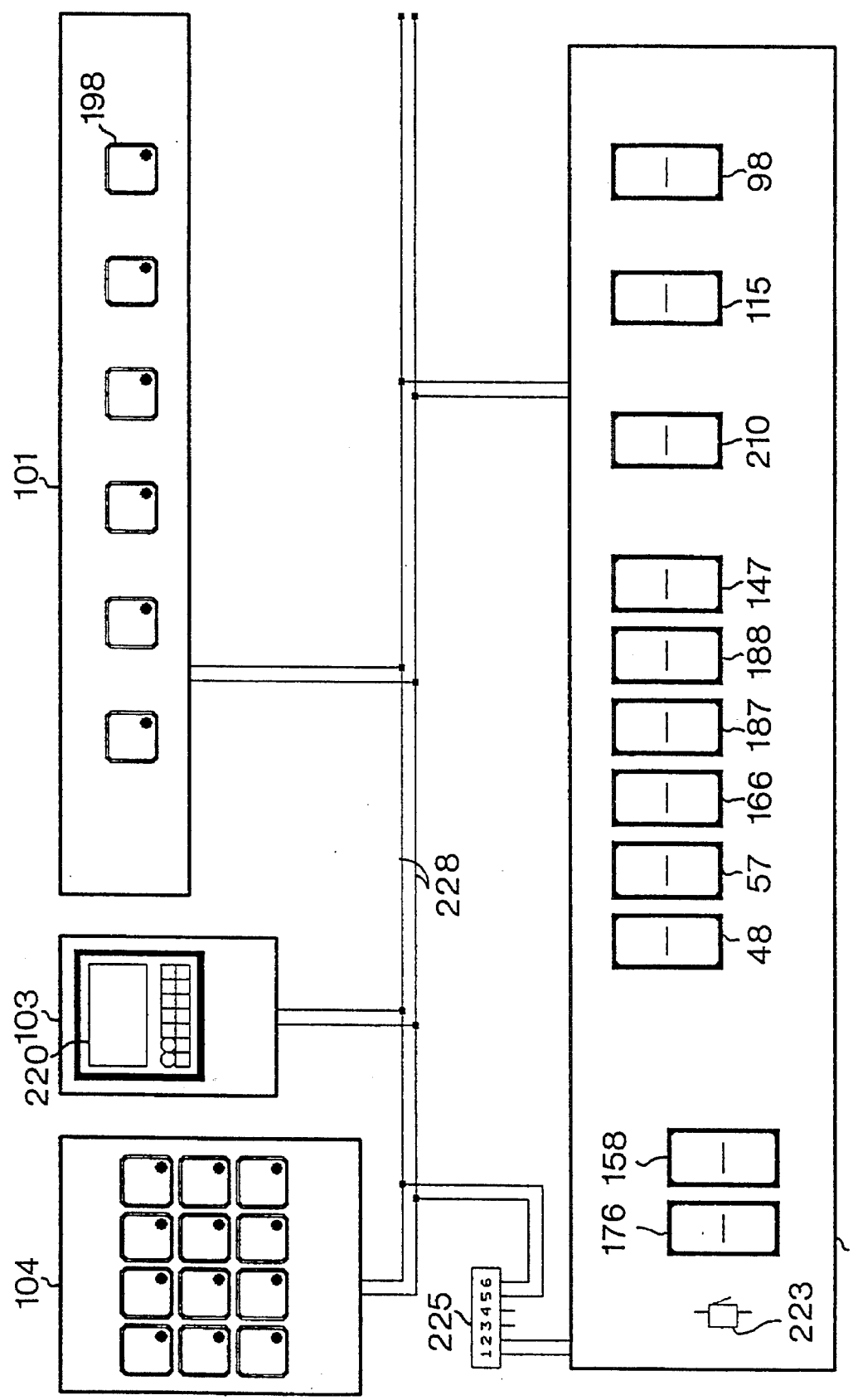

FIG. 7 shows a set of modules which are mounted in and near the dashboard 100. The warning lights module 101 contains a plurality of LEDs 198, which are lighted by the microprocessor means 218 of said module 101 upon reception of hazardous condition messages from the network. Such conditions include the high level of the grain in the grain tank 7, as detected by the sensor 96 or the anomalies in engine temperature and oil pressure.

The dashboard switch module 102 collects the input signals from the command switches in the dashboard 100. These switches include the header engagement switch 176, the threshing engagement switch 158, the unloading tube switch 48, the engine speed switch 57, the drum speed switch 166, the fan speed switch 187, the straw chopper engagement switch 115 and the 4WD engagement switch 98. Additional switches are installed for the selection of a manual or automatic control mode of variables, such as a monostable fan memory selection switch 188 and a bistable reel speed mode switch 147. The dashboard module 102 also controls a low volume audible alarm in the form of a buzzer 223.

The RPM status module 104 contains a plurality of LEDs which are lighted by the microprocessor means 218 of said module 104 when the actual RPM of a shaft, as communicated through the network 300, falls below a predetermined value that was set for that shaft. The operator thus is warned of excessive slippage or breakdown of one of the drivelines.

The dashboard 100 equally contains a socket means 225 in the form of a conventional RS232 socket for serial communication to the network 300 and the other microprocessor means 215, 218. This connection to the network 300 is used to transmit and receive single data messages, but also to reprogram the microprocessor means 215, 218 of the other modules.

In the operator's cab 6 is also installed the central display module 103, comprising a liquid crystal display 220, operable to communicate messages and graphs to the operator, a keyboard and microprocessor means 215 connected thereto, including a microprocessor unit and a permanent memory means (not shown) which is formed by a conventional EPROM or FLASH memory chip.

Figure 8:
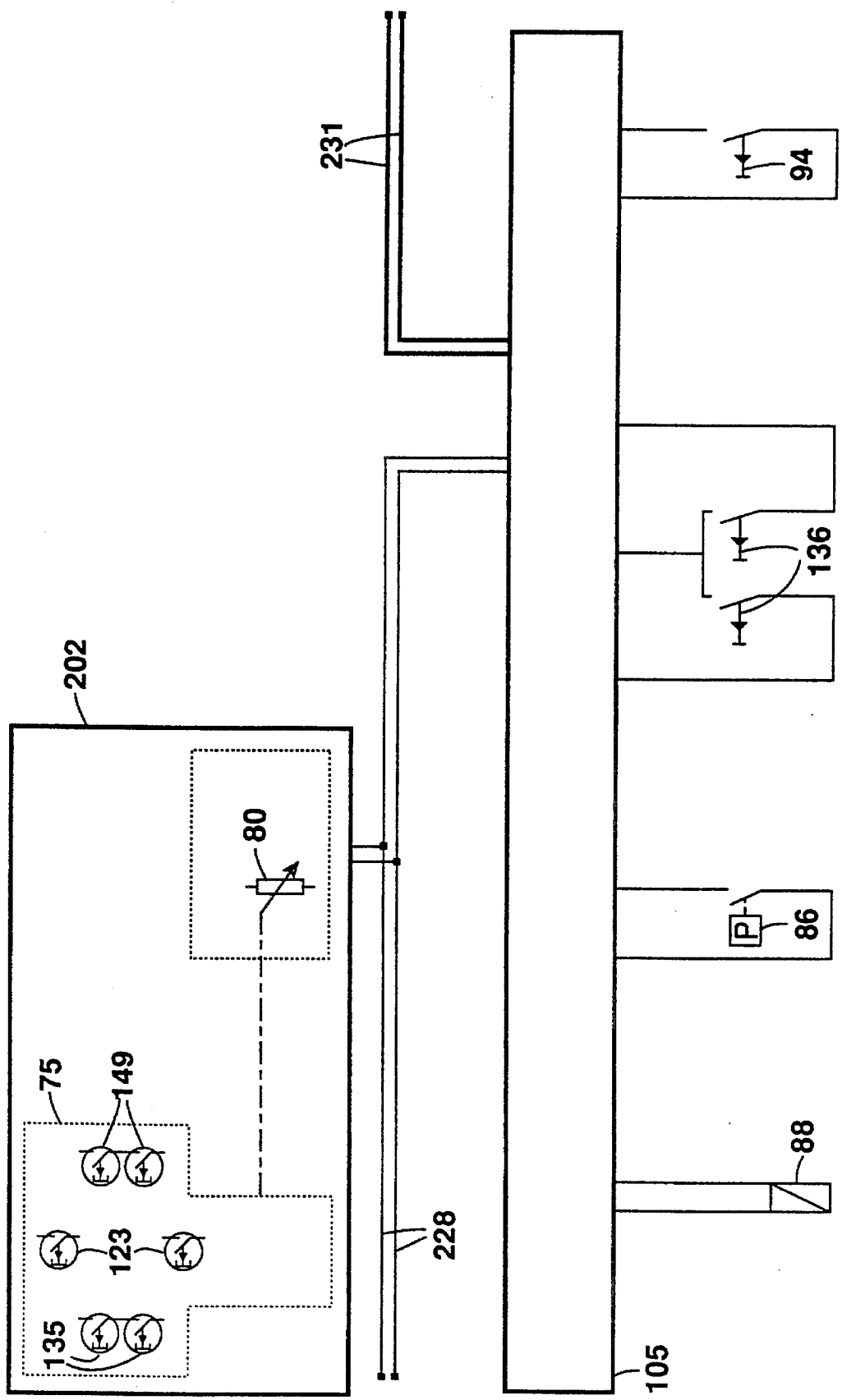

FIG. 8 is showing the arm rest module 202 comprising the multifunctional handle 75, with the push buttons for the command of header height (buttons 123), header reel height (buttons 135) and header reel speed (buttons 149). This module 202 further comprises the potentiometric device 80 of the ground speed command.

The operator's platform module 105 incorporates the sensor and command means on the platform 5. These comprise: the brake pressure sensor 86, the brake linkage sensor 88, the differential lock command pedal 94, and the horizontal reel adjustment switches 136.

Figure 9:
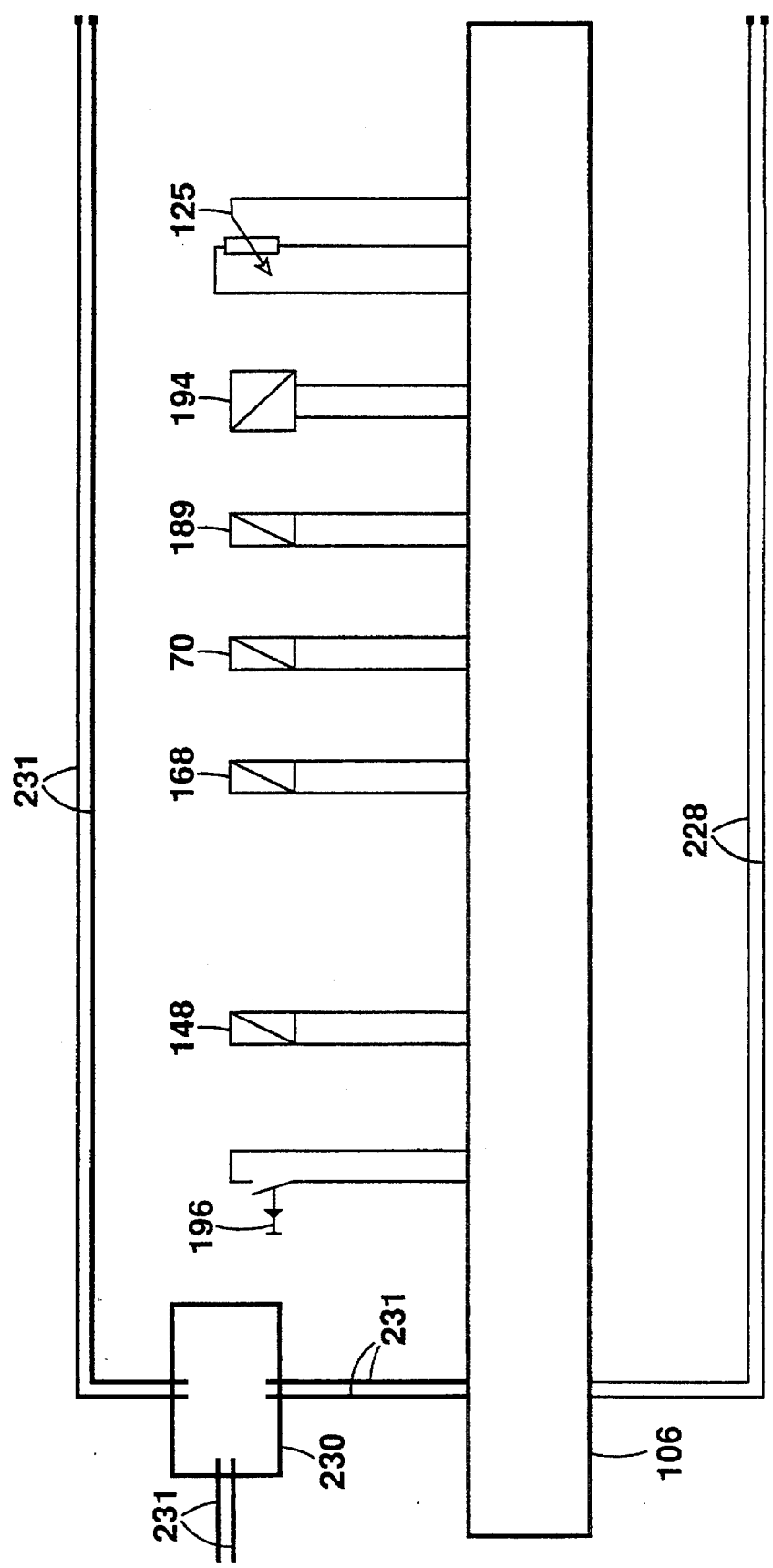

FIG. 9 is illustrating the sensor module 106 of the central box 240. It receives and processes signals from sensors, such as the grain tank level sensor 196, the reel speed sensor 148, the drum speed sensor 168, the ground speed sensor 70, the fan speed sensor 189, the sieve impact sensor 194 and the header height sensor 125.

The power module 107 of FIG. 10 is equally mounted in said central box 240. It comprises a solid state power module for the supply of tension and power to electrical consumers such as the motor 145 of the reel speed variator arrangement, the horn 113, the motor 164 of the threshing speed variator arrangement, the motor 185 of the fan speed variator arrangement, the solenoids of the header height adjustment valve 122, the stop lights 111, the rotating light 112 and the front and rear lights 110.

Figure 11:
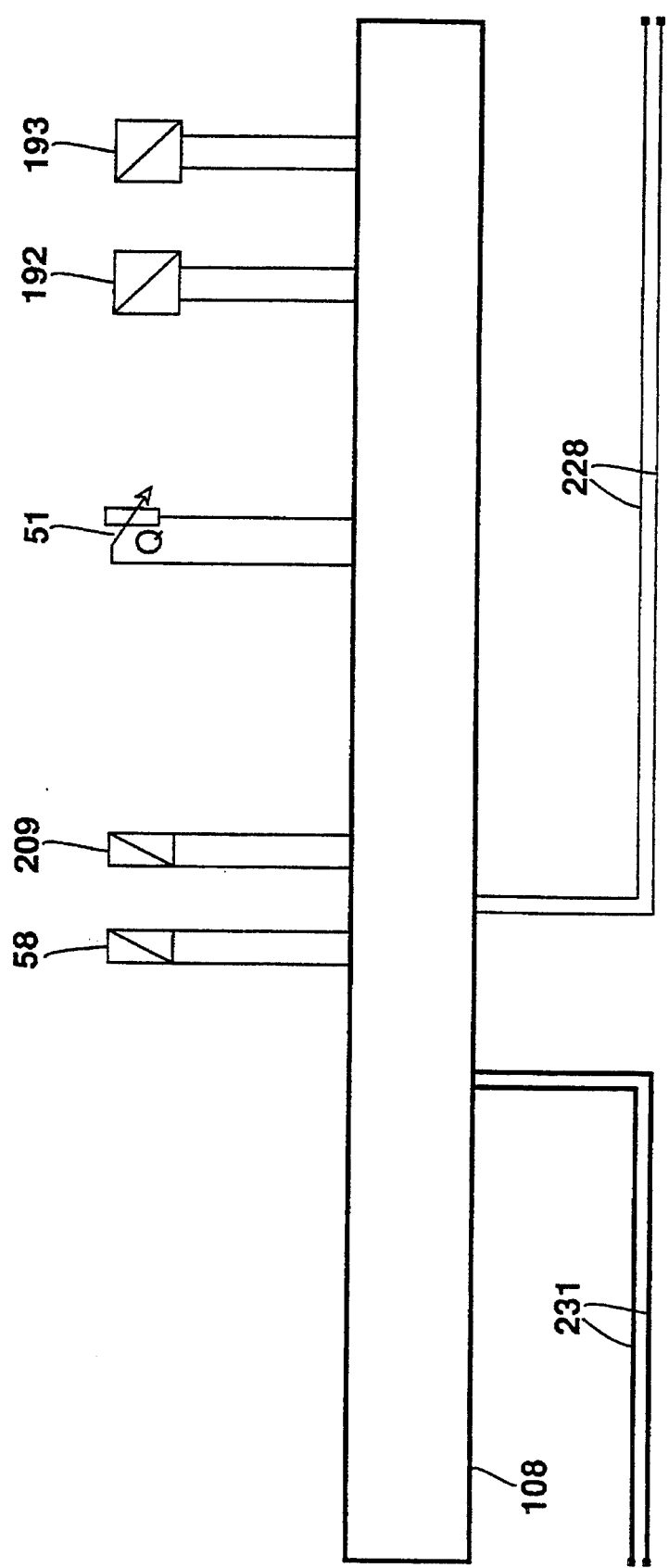

FIG. 11 shows the sensor module 108 of the engine box 241. It receives and processes signals from a second group of sensors, such as the engine speed sensor 58, the straw chopper speed sensor 209, the fuel level sensor 51, the concave impact sensor 192 and the straw walker impact sensor 193.

FIG. 12 illustrates the power module 109 of the engine box 241. It provides tension and power to further actuators, such as the engine speed actuator 56, the straw chopper clutch 206, the solenoid of the 4WD valve 97 and the solenoids of the ground speed variator valve 65 or, alternatively, the servo valve 78 of the hydrostatic drive.

In FIG. 13 the valve module 201 is shown which controls the solenoids in valve block 200, which module equally is installed in said box 241. It provides power to the solenoids of the header engagement valve 174, the threshing engagement valve 156, the unloading tube valve 46, the horizontal reel adjustment valve 132, the vertical reel adjustment valve 133 and the differential lock valve 93.

As every message on the single channel network 300 is received by every microprocessor means 215, 218, no extra wiring is needed for the implementation of additional automatic control routines, so that operator comfort and safety can be improved substantially at no extra cost.

In conventionally wired, self-propelled harvesting machines, the stop lights 111 are activated when the brake pedals 85 are depressed. This action is sensed by the brake pressure sensor 86 which then closes an electrical circuit to the stop lights 111. According to the present invention the stop lights 111 are lighted by the solid state power module 107 of the central box 240. The microprocessor means 218 of this module 107 provides power to the lights 111 upon detection of a wider range of machine conditions, which all correspond to a slowing down of the harvester 1. The lights 111 thus are activated when the actual ground speed as sensed by the sensor 70, is decreasing at a rate which exceeds a predetermined amount. The rate of speed decrease is calculated from the ground speed messages by the microprocessor means 218 of the module 107. The lights 111 also can be activated when the setting of the ground speed command potentiometer 80 is changed to slow down the machine 1. The decrease of the wanted ground speed can equally be detected by the said microprocessor means 218, if it checks the value of the wanted speed at regular intervals. These processes can be combined all together in order to light the stop lights 111 at any of said conditions, i.e. brake pressure, ground speed decrease and ground speed decrease command. Other road users riding behind a harvester thus under all circumstances are timely warned of harvester slowing down, even in the case that no brake pedal 85 is used, but another means, e.g. the hydrostatic drive, is used to stop the vehicle.

The maximum allowable speed during road transport for harvesters is limited by law in many countries. In some cases the manufacturer is compelled to limit the maximum speed of his products. Conventionally, non-adjustable abutments, which prevent the raise of the ground speed above a predetermined level and cannot be adjusted by the operator, are installed in the ground speed drive-line or in the command levers. Such systems require a cumbersome adaptation by the manufacturer when a completed harvester ultimately is sold with drive wheels which have a different diameter from that of the originally installed wheels, and when the country of destination has been altered, because speed limits vary for different countries. The module and network configuration permits this limitation in a non-mechanical way: via the RS232 socket means 225 data on wheel size, destination and maximum speed can be transmitted for storage in the microprocessor means 218 of the engine power module 109, which controls the speed actuator means, such as the servo valve 78 of the hydrostatic drive or the hydraulic valve 65 of the variator drive; the actual ground speed as sensed by the ground speed sensor 70 is transmitted to the said microprocessor means 218 for comparison; when this speed reaches said maximum speed, the microprocessor means 218 will disregard any further speed increase commands and thus halt the speed actuator means at the said maximum speed. Alternatively the comparison can take place in the arm rest module 202 and its microprocessor means 218, which is linked to the ground speed command 80, can stop the transmission of a speed increase command to the network 300, when the maximum speed is reached. When a harvester 1 is equipped with other wheels or reallocated to a country with different speed limits, it suffices to load new data in the network via the socket 225 in order to set the speed limits to other values.

Another legal requisition in some countries is the actuation of the rotating light 112 during road transport. Command for this actuation is given by the operator through switch 115 in the dashboard 100. The light 112 also is actuated automatically by the power module 107 upon transmission of a ground speed above the level which corresponds to harvesting conditions. Thus the rotating light 112 will work during the faster road travel.

The rotating light 112 also can be used as a warning means to people near the harvester 1 during backward travel. Upon detection of a reverse speed by the ground speed sensor 70, the microprocessor means 218 of the power module 107 activates the light 112. Alternatively the light 112 can be activated by the same module 107 when backward travel is commanded through the ground speed command 80. As an additional warning a short blow of the horn 113 is given at the beginning of the backward travel. The operator can do this by pushing the switch at the steering column 83, but the horn 113 is also activated automatically by the microprocessor means 218 of the power module 107, when an actual reverse speed or a reverse speed command message is received.

When the grain tank 7 is full, a sign has to be given to another driver to ride his wagon or truck along the harvester 1 to collect the grain therefrom. This signal can be the lighting of the rotating light 112. Upon receival of a full grain tank message from the grain tank sensor 196, the microprocessor means 218 of the power module 107 activates the light 112 for a predetermined time interval. The operator thus does not have to direct his attention to the grain tank level and can concentrate on the other harvesting operations.

The use of the Four Wheel Drive system is only recommended at low speed, off-road harvesting operations. When the 4WD switch 98 is set to ON, the microprocessor means 218 of the power module 109 only controls the valve 97 in order to provide driving power to the steerable wheels 4 when the ground speed, as sensed by the ground speed sensor 70, falls below a low predetermined speed, and to cut this power when the sensed ground speed raises above a high predetermined speed. The use of the 4WD thus automatically is limited to optimum conditions.

The differential lock in the gearbox 67 can get damaged when engaged or disengaged at high ground speed. Therefore, the microprocessor means 218 of the valve module 201 ignores any engagement or disengagement commands from the differential lock pedal 94 as long as the ground speed remains above a predetermined high speed. When the ground speed falls below said high speed, the valve module 201 resets the differential lock valve 133 back to the commanded condition. This process is protecting the differential lock system from hazardous setting changes.

The signal from the fuel level sensor 51 is used to display a wide range of data to the operator. The microprocessor means 215 of the display module 103 can put the fuel level on the display 220. It also combines these data with the lapsed time or the covered distance, which can be derived from the ground speed sensor 70 messages, in order to calculate the actual and average fuel consumption rate per hour or per kilometer. When the fuel quantity falls to the level of one hour's operation at average fuel consumption rate, the microprocessor means 215 generates a warning message on the display 220. The operator thus learns he has to refill within a short period of time.

Actuation of a single brake is useful during harvesting operations, but is hazardous during road travel. Therefore the brake pedals 85 must be linked when the harvester 1 is using the road, but this linkage is not visible at first sight. The microprocessor means 218 of the dashboard module 102 is programmed to sound the buzzer 223 when on the one hand the brake linkage sensor 88 senses no coupling of the pedals 85, and on the other hand the ground speed is raising above a predetermined level. Simultaneously a LED 198 is be lighted by the microprocessor means 218 of the warning lights module 101 and a warning message is displayed by the microprocessor means 215 of the display module 103. The attention of the operator thus is immediately drawn to the hazardous condition.

The reel speed mode switch 147 is used to select a 'manual' or an 'automatic' mode for reel speed adjustment. When the 'manual' mode is chosen, the microprocessor means 218 of the power module 107 actuates the reel variator motor 145 in order to vary the reel speed in accordance with the commands given by means of the push buttons 149 of the multifunctional handle 75. When the 'automatic' mode is chosen, the said microprocessor means 218 actuates the motor 145 in order to adapt the reel speed to the actual value of the ground speed as sensed by the sensor 70: the reel speed is adjusted until the difference between reel speed and ground speed meets a substantially constant value. Standing crop thus is bent over to the header 11 in a constant fashion, irrespective of the ground speed of the harvester 1. The actual reel speed is detected by the sensor 148 and the microprocessor means 218 of the sensor module 106 transmits its value to the network 300, so that it can be used for feedback by the microprocessor means 218 of the modules 107 in the reel adjustment process.

When the fan memory selection switch 188 is not pressed, the motor 185 of the fan speed variator is actuated by power module 107 to change the fan speed as commanded by the fan speed switch 187. The actual fan speed is sensed by the sensor 189 and its value is transmitted to the network 300 by the sensor module 106 and displayed to the operator by the module 103. When the selection switch 188 is pushed up for a longer time, e.g. for more than three seconds, the actual fan speed is stored in a first memory of the microprocessor means 218 of the power module 107 and when the switch 188 is pushed down for a longer time, it is stored in a second memory of the same microprocessor means 218. When the switch 188 is pushed up for a shorter time, the said microprocessor means 218 compares the actual fan speed value to the value in the first memory and steers the power module 107 to adjust the fan speed to this value. In a similar way the fan speed is adjusted to the value in the second memory, when the switch 188 is pushed down for a shorter time. The operator thus is able to change the fan speed by a simple pulse command.

Such system proves extremely useful each time when the operator reaches the border of a field and has to turn the harvester. The operator has to switch the fan speed from one setting to another in order to meet the changed conditions of relative wind direction and field slope.

Alternatively, an inclination sensor (not shown) may be installed on the harvester 1 for measurement of the field slope in the direction of harvester movement. The signal from this sensor then can be used by the microprocessor means 218 of module 107 for the choice of one of said fan speed memories and adjustment of the fan speed to the value stored therein. With such a system it suffices that the operator sets the fan speed manually to a first value during downhill travel, stores it in the first memory, sets the speed to second value during uphill travel and stores it in the second memory, whereafter the fan speed is switched automatically between these values every time the inclination sensor feels a transition from uphill to downhill travel and vice versa.

When the threshing engagement switch 158 is set to ON (and it thus may supposed that the harvester is standing in the open), and the operator gives a pulse command on the switch 48 to change the position of the unloading tube 43, the microprocessor means 218 of valve module 201 accordingly activates one of the solenoids of valve 46 to extend or retract the cylinder 45, until the operator gives an opposite pulse command on the switch 48, by which action the valve 46 is deactivated and the cylinder 45 is stopped. On the other hand, when the switch 158 is set to OFF, the microprocessor means 218 of module 201 stops all activation of the valve 46 as soon as the switch 48 is released. This second command mode is useful during servicing in buildings, where the tube 43 otherwise might hit walls or supports when completely pivoted.

Upon switching the threshing engagement switch 158 from OFF to ON, the microprocessor means 218 of the engine power module 109 first makes actuator 56 reduce the engine speed, before the valve module 101 puts an electrical tension over the engagement valve 156. After the engagement of the threshing mechanism 8 the power module 109 makes the engine 10 resume its original speed. Switching the straw chopper engagement switch 210 from OFF to ON has the same effect on the control of the engine speed. This process reduces the stress on the drive belts 60, 205 during the engagement of the crop processing means.

As the threshing and cleaning capacity of the harvester 1 is limited, an unacceptably high quantity of grain will be lost at the rear of the walkers 20 and the sieve 28 whenever the amount of crop material fed to the harvester is too high. When over a predetermined time too high a level of grain losses is sensed by the impact sensors 193, 194, the microprocessor means 218 of the engine power module 109 actuates the servo valve 78 of the hydrostatic drive or the valve 65 of the variator drive in order to reduce the ground speed and thus the flow of crop material to the harvester 1, until the sieve losses have reached an predetermined, acceptable level. The ground speed thus is adjusted automatically to the crop conditions.

When the self-propelled harvester 1 reaches the border of a field, the operator turns it on a portion of the field which is free of crop, the so-called head land. The head land is detected by the impact sensor 192 under the concaves 19, in as much as, upon entering the head land, the threshing and separation mechanism 8 no longer are fed with crop. Upon detection of a substantial reduction of crop flow for a predetermined length of time, which is characteristic for head land, a wide range of machine settings is automatically set to predetermined, standard conditions. These conditions can be changed and loaded in the memories of the various microprocessor means 215, 218 via the RS232 socket means 225 or via the command means, such as the keyboard of the display module 103. The said machine settings comprise the height of the header 11, the speed of the fan 25 and the speed of the reel 128, which are controlled by the microprocessor means 218 of power module 107. The reel speed is set to a predetermined speed, or alternatively, the automatic adjustment of the reel speed to the ground speed is switched on. The settings further comprise the horizontal and vertical positions of said reel 128, which are controlled by the microprocessor means 218 of valve module 201. Upon detection of the headland, the automatic control of the ground speed in accordance with the grain losses is disabled by the microprocessor means 218 of power module 109.

When the harvester is modified by adding features such as the 4WD or the straw chopper 30, there is no need for extensive rewiring. It suffices to link the electrical connections to the nearby modules and to pass an adapted program via the RS232 socket means 225 to the microprocessor means 215, 218 of said modules. Alternatively, the microprocessor means 218 can be programmed to check whether a feature is present and to select a control routine accordingly. Thus is offered a large flexibility for modification of the harvester features.

The microprocessor means 215, 218 have the possibility to detect abnormal conditions such as a short-circuit, a broken connection or a faulty actuator. When such conditions are established the microprocessor transmits an error message to the network 300. The display module 103 warns the operator by means of a warning text on the display 220, and the other microprocessor means 215,218 switch to alternative routines or use default values in order to by-pass the faulty component if possible. Thus is enhanced the total reliability of the whole harvester 1.

The described process for the control of agricultural harvester can further be refined by the addition of other sensor command and actuator means or by loading other control programs into the modules, without departing from the original idea of the invention. It also is easily applicable to other self-propelled harvesting machines such as e.g. forage harvesters and potato harvesters.

I claim:

1. Apparatus for controlling the settings of a self-propelled agricultural harvesting machine having a..plurality of machine command means for producing command signals, a plurality of status sensors for producing status signal, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages. produced by_any one of said microprocessor means are simultaneously transmitted to the other of said microprocessor means to cause one of said other microprocessor means to control a machine actuator means connected thereto, said status sensors including a ground speed sensor producing a signal corresponding to the actual ground speed of said machine;

said microprocessor means controlling an actuator means to provide an electrical tension over stop lights when said ground speed sensor senses a ground speed drop which exceeds a predetermined amount.

2. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto; said machine commands means comprising a ground speed command and said machine actuator means comprising a ground speed actuator, operable to change the ground speed of the machine.

3. Apparatus as claimed in claim 2 wherein said ground speed actuator controls the setting of a variator device which drives propelling means for propelling said machine.

4. Apparatus as claimed in claim 3 wherein said microprocessor means keep said ground speed actuator from increasing the ground speed whenever said ground speed sensor senses a speed above a first predetermined ground speed and said microprocessor means ignore output signals from said ground speed command, when said ground speed command increase the ground speed.

5. Apparatus as claimed in claim 2 wherein said microprocessor means controls an actuator means to provide an electrical tension over stop lights when said ground speed command is set to decrease the wanted ground speed.

6. Apparatus as claimed in claim 2, wherein said ground speed command comprises a lever driving a potentiometric device to produce output signals, and said ground speed actuator controls a fluid flow to a hydrostatic motor which drives a propelling means for propelling said machine.

7. Apparatus as claimed in claim 2 wherein one of said machine status sensors is a crop flow sensor, which senses the movement of crop particles at a fixed location of the machine, and said microprocessor means apply a signal to said ground speed actuator in accordance with the crop flow sensed by said crop flow sensor.

8. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto;

at least one of said actuator means being a warning actuator, which controls the operation of a warning device.

9. Apparatus for controlling the settings of a self-propelled agricultural harvesting machine having a plurality of machine command means for producing command signals, a plurality of status sensors for producing status signals, and a plurality of machine actuator means for adjusting said settings said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto; said status sensors including a ground speed sensor producing a signal corresponding to the actual ground speed of said machine, said harvesting machine further comprising a Four Wheel Drive system, operable to provide driving power to wheels, said actuator means comprising a Four Wheel Drive actuator, and said command means comprising a Four Wheel Drive engagement command said microprocessor means being responsive to said engagement command to set said Four Wheel Drive actuator to disengage the Four Wheel Drive system whenever said ground speed exceeds a predetermined speed.

10. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto;

said status sensors including a ground speed sensor producing a signal corresponding to the actual ground speed of said machine;

said harvesting machine including a differential lock mechanism, operable to impede the relative movement between left and right propelling means, said actuator means comprising a differential lock actuator, and said command means comprising a lock engagement and disengagement command, said microprocessor means changing the settings of said actuator in accordance with said disengagement command, whenever said ground speed sensor does not exceed a predetermined speed.

11. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto; said status sensors including a fuel sensor for producing a signal which corresponds to the fuel level in a fuel tank of the harvesting machine, said microprocessor means including means for calculating the fuel quantity and the mean fuel consumption rate from said fuel sensor signal and generating an output signal when the calculated fuel quantity will fall to zero over a predetermined period of time.

12. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification Of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby message produced by any one of said microprocessor means are simultaneously transmitted to all the other of said microprocessor means to cause one of said other microprocessor means to control a machine actuator means connected thereto; said harvesting machine including a fan means, said machine commands means comprising a fan speed command and said machine actuator means comprising a fan speed actuator, operable to change the rotational speed of said fan means.

13. Apparatus as claimed in claim 12 wherein said fan means is driven through a variator device and said actuator means controls the setting of said variator device, said microprocessor means comprising fan speed memories into which wanted fan speeds are loaded, and said command means comprising means for the selection of one of said memories, said microprocessor means setting said fan speed actuator to change said rotational speed of said fan means to one of said wanted fan speeds upon operation of said memory selection means; and, means for comparing said actual fan speed to the wanted fan speed in the selected speed memory, and setting said fan speed actuator to lower or increase the actual fan speed until the actual fan speed is equal to the wanted fan speed.

14. Apparatus as claimed in claim 13 wherein said status sensors comprise an inclination sensor, of which the signal corresponds to the inclination of the harvesting machine in the direction of travel of the machine, and said microprocessor means set said fan speed actuator to change the fan speed to a first wanted speed when said inclination sensor senses uphill travel, and to a second wanted speed when said inclination sensor senses a downhill inclination.

15. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine.

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages. produced by any one of said microprocessor means are simultaneously transmitted to all the other of said microprocessor means to cause one of said other microprocessor means to control a machine actuator means connected thereto; said harvesting machine including a separation means, said machine commands means comprising a separator speed command and said machine actuator means comprising a separator speed actuator, operable to change the rotational speed of said separation means.

16. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of Said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby message produced by any one of said microprocessor means are simultaneously transmitted to all the other of said microprocessor means to cause one Of said other microprocessor means to control a machine actuator means connected thereto, said harvesting machine further including a tank for the collection of harvested crop material, said status sensors comprising a level sensor for producing a signal corresponding to the level of crop material in said tank.

17. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto, one of said machine status sensors being a crop flow sensor, which senses the impact of crop particles thereon at a fixed location of the machine.

18. Apparatus as claimed in claim 17 wherein said harvesting machine further comprises a separation means, said crop flow sensor being located under said separation means, and a header means with a rotating reel for leading crop material to the entrance of the harvesting machine and said microprocessor means generates output signals to machine actuator means to adjust the speed of said reel whenever said crop flow sensor senses a substantial reduction of crop movement during a continuous period, which is longer than a predetermined length of time.

19. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages. produced by any one of said microprocessor means are simultaneously transmitted to all the other of said microprocessor means to cause one of said other microprocessor means to control a machine actuator means connected thereto, said harvesting machine further comprising:

left and right brake command means for the actuation of respective left and right brakes on propelling means; and brake link means engageable to link said left and right brake command means, said status sensors comprising a brake linkage sensor which senses whether said brake link means is engaged.

20. Apparatus as claimed in claim 19 wherein said brake command means comprise left and right brake pedals and said brake link means comprises a removable connection between said pedals, said apparatus further comprising a ground speed sensor and an alarm device, said microprocessor means being responsive to said ground speed sensor and said brake linkage sensor for actuating said said alarm device whenever said brake linkage sensor senses disengaged brake link means and the ground speed sensor senses a speed which exceeds a predetermined ground speed.

21. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto, said harvesting machine further comprising an engine, said machine command means comprising an engine throttle command, said machine actuator means comprising an engine throttle actuator, operable to change the setting of said throttle.

22. Apparatus as claimed in claim 21 wherein said throttle actuator comprises an electrically operated spindle which is linked to a throttle control lever.

23. Apparatus for controlling the settings of a self-propelled agricultural harvesting machine having a plurality of machine command means for producing command signals, a plurality of status sensors for producing status signals, and a plurality of machine actuator means for adjusting said settings, said apparatus further comprising:

a plurality of microprocessor means disposed in groups, each group being disposed in a different region of said agricultural harvesting machine;

first connecting means connecting each respective machine command means, each respective status sensor, and each respective actuator means to a microprocessor means;

said plurality of microprocessor means including means responsive to command signals and status signals for producing messages including an initial portion for identification of message type and relative priority, and means responsive to messages for controlling the machine actuator means connected thereto; and, second connecting means including transmit/receive means connecting said plurality of microprocessor means in a multi-master bidirectional single channel network configuration for serial communication of digital data messages whereby messages produced by any one of said microprocessor means are simultaneously transmitted to all the other of said microprocessor means to cause one of said other microprocessor means to control a machine actuator means connected thereto, said harvesting machine further comprising a crop processing means, operable to process the flow of crop led into the machine, said machine commands means comprising a processing engagement command and said machine actuator means comprising a processing engagement actuator, operable to engage or disengage the drive of said processing means.

24. Apparatus as claimed in claim 23 wherein said processing means comprise separation means, said engagement command being a separation engagement command and said engagement actuator comprising a separation engagement actuator, operable to engage or disengage the drive of said separation means.

25. Apparatus as claimed in claim 24 wherein said separation engagement actuator comprises an electrically controlled hydraulic valve, which controls the flow of hydraulic fluid from and to a hydraulic cylinder, which holds a lever to engage and disengage a belt drive to said separation means.

26. Apparatus as claimed in claim 23 wherein said processing means comprise chopping means, said engagement command being a chopping engagement command and said engagement actuator comprises a chopping engagement actuator, operable to engage or disengage the drive of said chopping means.

27. Apparatus as claimed in claim 26 wherein said chopping engagement actuator comprises an electrical clutch, which transfers driving power from a driving belt to a driven belt, operable to rotate said chopping means.

28. Apparatus as claimed in claim 23 wherein said harvesting machine includes an engine, said machine command means comprise an engine throttle command, and said machine actuator means comprise an engine throttle actuator operable to change the setting of said throttle whereby, upon operation of said processing engagement command, said microprocessor means set the throttle actuator to reduce the engine speed before said processing engagement actuator engages said processing means.

* * * * *